United States Patent
Nádas et al.

(10) Patent No.: US 12,021,756 B2
(45) Date of Patent: Jun. 25, 2024

(54) MULTI-QUEUE PACKET PROCESSING PERFORMED BY AN INTERMEDIATE DEVICE IN A COMMUNICATION NETWORK

(71) Applicant: Telefonaktiebolaget LM Ericsson (publ), Stockholm (SE)

(72) Inventors: Szilveszter Nádas, Santa Clara, CA (US); Sandor Laki, Budapest (HU); Gergo Gombos, Budapest (HU); Ferenc Fejes, Budapest (HU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 18/267,291

(22) PCT Filed: Oct. 22, 2021

(86) PCT No.: PCT/IB2021/059763
§ 371 (c)(1),
(2) Date: Jun. 14, 2023

(87) PCT Pub. No.: WO2022/153105
PCT Pub. Date: Jul. 21, 2022

(65) Prior Publication Data
US 2024/0056401 A1    Feb. 15, 2024

Related U.S. Application Data

(60) Provisional application No. 63/136,724, filed on Jan. 13, 2021.

(51) Int. Cl.
*H04L 47/62* (2022.01)
*H04L 47/10* (2022.01)
*H04L 47/12* (2022.01)

(52) U.S. Cl.
CPC .......... *H04L 47/6215* (2013.01); *H04L 47/12* (2013.01); *H04L 47/29* (2013.01)

(58) Field of Classification Search
CPC ...... H04L 47/6215; H04L 47/12; H04L 47/29
See application file for complete search history.

(56) References Cited

U.S. PATENT DOCUMENTS

| 2013/0275843 A1 | 10/2013 | Narayanan et al. |
| 2016/0173354 A1* | 6/2016 | Zhao .................. H04L 43/04 370/232 |

(Continued)

OTHER PUBLICATIONS

Bosshart, P. et al., "Programming Protocol-Independent Packet Processors", ACM SIGCOMMM Computer Communication Review, Dec. 2013, pp. 1-8, ResearchGate.

(Continued)

*Primary Examiner* — Azizul Choudhury
(74) *Attorney, Agent, or Firm* — COATS & BENNETT, PLLC

(57) ABSTRACT

An intermediate device (110) of a communication network (100) assigns each of a plurality of received packets (300) to either a Low Latency, Low Loss, Scalable throughput (L4S) queue (370a) or a non-L4S queue (370b). Each queue (370a, 370b) is associated with one packet value size counter for each of the plurality of packet values (320). The intermediate device (110) increments, for each packet (300) and by a size of the packet (300), the packet value size counter associated with the queue (370a, 370b) to which the packet (300) is assigned and calculates, for each queue (370a, 370b), a congestion threshold value based on the packet value size counters associated with the queue (370a, 370b). The intermediate device (110) marks one or more of the packets (300) as having experienced congestion based on the congestion threshold values of the queues (370a, 370b).

19 Claims, 9 Drawing Sheets

(56) References Cited

U.S. PATENT DOCUMENTS

| | | | | |
|---|---|---|---|---|
| 2020/0053018 A1* | 2/2020 | White | ............... | H04L 47/6275 |
| 2021/0112006 A1* | 4/2021 | Francini | ............... | H04L 47/115 |
| 2023/0142425 A1* | 5/2023 | Nádas | ............... | H04L 47/31 |
| | | | | 370/412 |

OTHER PUBLICATIONS

Gimenez, S. et al., "A Proof of Concept implementation of a RINA interior router using P4-enabled software targets", 7th International Workshop on the Recursive InterNetwork Architecture (RINA 2020), Feb. 2020, pp. 57-62, ResearchGate.

Fejes, F. et al., "A Core-Statelesss L4S Scheduler for P4-enabled hardware switches with emulated HQoS", IEEE INFOCOM 2021 Demo—IEEEE Conference on Computer Communications Workshops (INFOCOM WKSHPS), May 10-13, 2021, pp. 1-2, IEEE.

Nádas, S. et al., "A Congestion Control Independent L4S Scheduler", ANRW' 20: Proceedings of the Applied Networking Research Workshop, Jul. 27-30, 2020, pp. 45-51, ACM Digital Library.

Briscoe, B. et al., "Low Latency, Low Loss, Scalable Throughput (L4S) Internet Service: Architecture", Internet-Draft L4S Architecture, Mar. 22, 2018, pp. 1-32, Internet Engineering Task Force (IETF).

IETF—Internet Engineering Task Force, "IETF108-ANRW-20200730-1410: Transport Protocols and Traffic Engineering", Jul. 31, 2020, pp. 1-2, retrieved on Jun. 14, 2023, retrieved from internet: https://www.youtube.com/watch?v=WOOZGJN6VkY.

* cited by examiner

MULTI-QUEUE PACKET PROCESSING PERFORMED BY AN INTERMEDIATE DEVICE IN A COMMUNICATION NETWORK

RELATED APPLICATIONS

This application claims priority to U.S. Provisional patent Application Ser. No. 63/136,724 filed Jan. 13, 2021, the entire contents of which are incorporated by reference herein.

TECHNICAL FIELD

This application generally relates to the field of computer networking, and more particularly relates to packet processing performed by an intermediate device in a computer network.

BACKGROUND

In computer networks, endpoints traditionally exchange packets with each other either directly or via one or more intermediate devices. A common example of such an intermediate device is a router. Traditionally, routers were designed to be relatively simple in accordance with the so-called "end-to-end principle." The end-to-end principle is a computer networking design principle that favors implementation of features at endpoints rather than in intermediate devices. One reason that the end-to-end principle has traditionally been favored is that simple intermediate devices tend to keep the compatibility requirements of endpoints low, thereby enabling a wide variety of devices to be network-capable.

More recently, there has been a trend of increasing the intelligence of particular intermediate devices in order to improve certain aspects of the network. This trend has given rise to the use of "middleboxes" within networks. A "middlebox" is an intermediate computer networking device between endpoints that transforms, inspects, filters, and/or otherwise manipulates traffic for purposes other than merely routing or forwarding packets between endpoints. Examples of middleboxes include firewalls, intrusion detection systems (IDSs), network address translators (NATs), load balancers, wide area network (WAN) optimizers, and deep packet inspection (DPI) devices.

A particular technique that has been implemented by certain types of intermediate devices is known as packet marking. Packet marking involves adding information to a packet for potential use by downstream devices and/or processing. For example, an edge router may use packet marking to apply a label to a packet that indicates that packet's importance. The label may then be used by other routers to prioritize the handling of the packet as it traverses the network towards its destination endpoint. Packet marking has proven to be a useful technique to enable effective bandwidth sharing control and traffic congestion avoidance within a network.

There are any number of creative ways in which packet processors can be programmed in order to effectively enhance the routing of packets through the network. This programming may be accomplished, for example, using P4. P4 is a high-level, protocol-independent language for programming packet processors.

However, there are presently many limitations to the amount or variety of processing tasks that packet processors are able to perform. Further, to the extent that certain packet processors are able to perform certain tasks, the amount of processing overhead and/or computing resources required to perform those tasks may be too severe to be reasonably used in many networks. The requirements imposed by certain novel Internet applications that may require both low latency and high throughput at the same time can pose significant challenges to access aggregation networks (AAN) in particular. In general, it would be advantageous for packet processors to implement processing functions at high switching speeds, low switching latency, low computational overhead, and/or low computer resource consumption.

SUMMARY

Embodiments of the present disclosure generally relate to packet processing performed by an intermediate device in a computer network. As will be described in greater detail in the detailed description section, these embodiments include one or more methods, devices, systems, carriers, mediums, circuitry, and/or software for performing such processing.

Particular embodiments of the present disclosure include a method implemented by an intermediate device of a communication network. The method comprises receiving a plurality of packets, each packet comprising a packet value. The packet value of each packet is one of a plurality of packet values that respectively identify a unique packet classification. The method further comprises assigning each of the packets to either a Low Latency, Low Loss, Scalable throughput (L4S) queue or a non-L4S queue. Each queue is associated with one packet value size counter for each of the plurality of packet values. The method further comprises incrementing, for each packet and by a size of the packet, the packet value size counter associated with the queue to which the packet is assigned. The method further comprises calculating, for each queue, a congestion threshold value based on the packet value size counters associated with the queue. The method further comprises marking one or more of the packets as having experienced congestion based on the congestion threshold values of the queues.

In some embodiments, the method further comprises incrementing, for each packet and by the size of the packet, a total size counter associated with the queue to which the packet is assigned, wherein calculating the congestion threshold value for each queue is further based on the total size counter associated with the queue. In some such embodiments, the method further comprises periodically updating a control plane of the intermediate device with the total size counters of the queues. In some such embodiments, the method further comprises periodically updating the control plane of the intermediate device with the packet value size counters associated with each of the queues. In some such embodiments, the periodic updating of the control plane with the total size counters is more frequent than the periodic updating of the control plane with the packet value size counters.

In some embodiments, the method further comprises generating, for each of the queues, a histogram representing a distribution of the packet values comprised in the plurality of packets, wherein calculating the congestion threshold values for each queue comprises selecting the congestion threshold value of each queue based on the histogram of the queue. In some such embodiments, selecting the congestion threshold value of each queue based on the histogram of the queue comprises selecting, as the congestion threshold value of the queue, the highest packet value in which a total size of all of packets represented in the histogram having the highest packet value or higher is not less than a threshold. In some such embodiments, the method further comprises calculating the threshold based on a total size of the packets represented in the histogram and a marking probability.

In some embodiments, the method further comprises periodically performing the calculating of the congestion threshold values for each queue, by the control plane, responsive to the periodic updating of the control plane with the total size counters associated with the queues.

In some embodiments, the method further comprises receiving a plurality of additional packets respectively comprising packet values and assigning each of the additional packets to one of the queues. The method further comprises determining, for each of the additional packets, whether to drop the additional packet based on the congestion threshold value of the queue and the packet value of the additional packet.

Other embodiments include an intermediate device. The intermediate device is configured to receive a plurality of packets, each packet comprising a packet value. The packet value of each packet is one of a plurality of packet values that respectively identify a unique packet classification. The intermediate device is further configured to assign each of the packets to either a Low Latency, Low Loss, Scalable throughput (L4S) queue or a non-L4S queue. Each queue is associated with one packet value size counter for each of the plurality of packet values. The intermediate device is further configured to increment, for each packet and by a size of the packet, the packet value size counter associated with the queue to which the packet is assigned. The intermediate device is further configured to calculate, for each queue, a congestion threshold value based on the packet value size counters associated with the queue. The intermediate device is further configured to mark one or more of the packets as having experienced congestion based on the congestion threshold values of the queues.

In some embodiments, the intermediate device is further configured to perform any one of the methods described above.

In some embodiments, the intermediate device comprises processing circuitry and a memory containing instructions executable by the processing circuitry whereby the intermediate device is configured as described above.

Other embodiments include a computer program, comprising instructions which, when executed on processing circuitry of an intermediate device, cause the processing circuitry to carry out any one of the methods described above.

Yet other embodiments include a carrier containing the computer program of the preceding embodiment, wherein the carrier is one of an electronic signal, optical signal, radio signal, or computer readable storage medium.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of an endpoint 120, generally, as opposed to discussion of particular instances of endpoints 120a, 120b).

DETAILED DESCRIPTION

Figure 1:
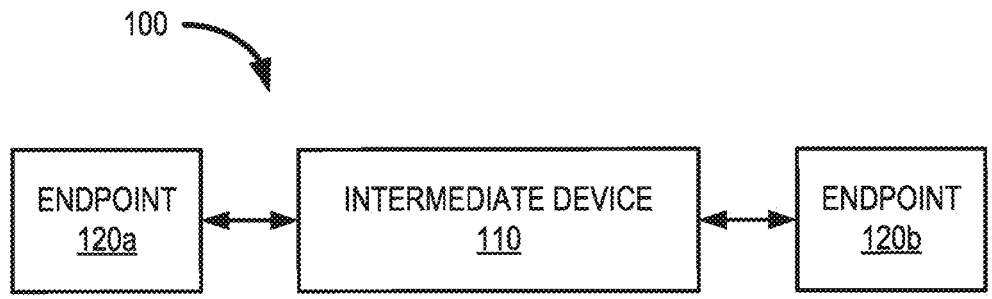
FIG. 1 is a schematic illustrating an example network, according to one or more embodiments of the present disclosure.

FIG. 1 is a block diagram illustrating an example of a communication network 100. The network 100 comprises endpoints 120a, 120b, and an intermediate device 110 that is communicatively connected to the endpoints 120a, 120b. It will be appreciated that although FIG. 1 depicts only a single intermediate device 110, other embodiments may include one or more other intermediate devices that may be in parallel or in series between the endpoints 120a, 120b. Thus, the intermediate device 110 may be connected directly to either or both of the endpoints 120a, 120b, or may be indirectly connected to either or both of the endpoints 120a, 120b via one or more other intermediate devices, depending on the particular embodiment.

An endpoint 120 that originates transmission of a packet is referred to herein as a source node. An endpoint 120 for which such a packet is ultimately intended is referred to herein as a destination node. The intermediate device 110 facilitates the exchange of one or more packets between one or more source nodes and one or more destination nodes.

The packets may any of a variety of different types. Examples of the most common types of packets include Internet Protocol (IP) packets (e.g., Transmission Control Protocol (TCP) packets), Multiprotocol Label Switching (MPLS) packets, and/or Ethernet packets. Among other things, the packets may comprise one or more fields for storing values used by the intermediate node 110 for performing packet processing. These fields may be in either the header or payload section, as may be appropriate.

Figure 2:
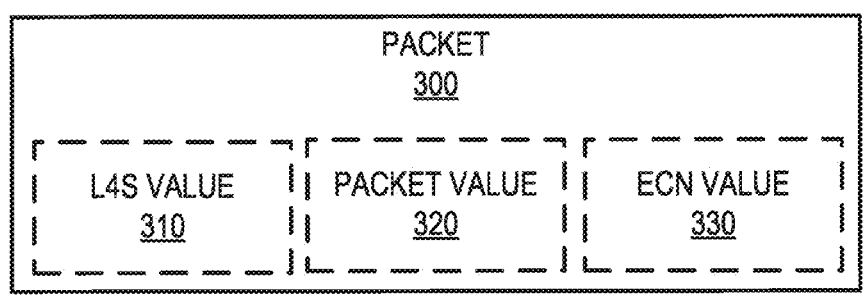
FIG. 2 is a schematic illustrating an example packet, according to one or more embodiments of the present disclosure.

FIG. 2 illustrates an example packet 300, in accordance with particular embodiments of the present disclosure. The packet 300 may comprise a Low Latency, Low Loss, Scalable throughput (L4S) value 310, a Packet Value (PV) 320, and/or an Explicit Congestion Notification (ECN) value 330.

The L4S value 310 is a value that indicates whether or not the packet 300 belongs to a flow that is L4S capable. In general, L4S flows are considered to be more scalable than traditional flows. In some embodiments, the L4S value 310 may be stored in a single-bit of a predefined field in the packet 300. In other embodiments, the L4S value 310 may be a predefined identifier that indicates whether or not the packet 300 supports L4S.

The PV 320 is a value that indicates a classification of the packet 300. For example, the PV 320 may indicate a drop precedence of the packet 300. In one particular embodiment, a packet 300 with a relatively lower PV 320 will be treated as having a higher drop precedence and will tend to be dropped by the intermediate device 110 more frequently than a packet 300 having a relatively higher PV 320. Alternatively, other embodiments may use a relatively low PV 320 to indicate a relatively low drop precedence.

The ECN value 330 is a value that may indicate whether or not the packet 300 is ECN capable and/or whether the packet 300 has experienced congestion on route to the intermediate device 110. In particular, the ECN value 300 may, in some embodiments, be comprised in a traffic class field of an IPv4 or IPv6 header of the packet 300. In particular, the ECN value 330 may, in some embodiments, be a value that conforms with RFC 3168 and/or other relevant internet standards publication.

Figure 3:
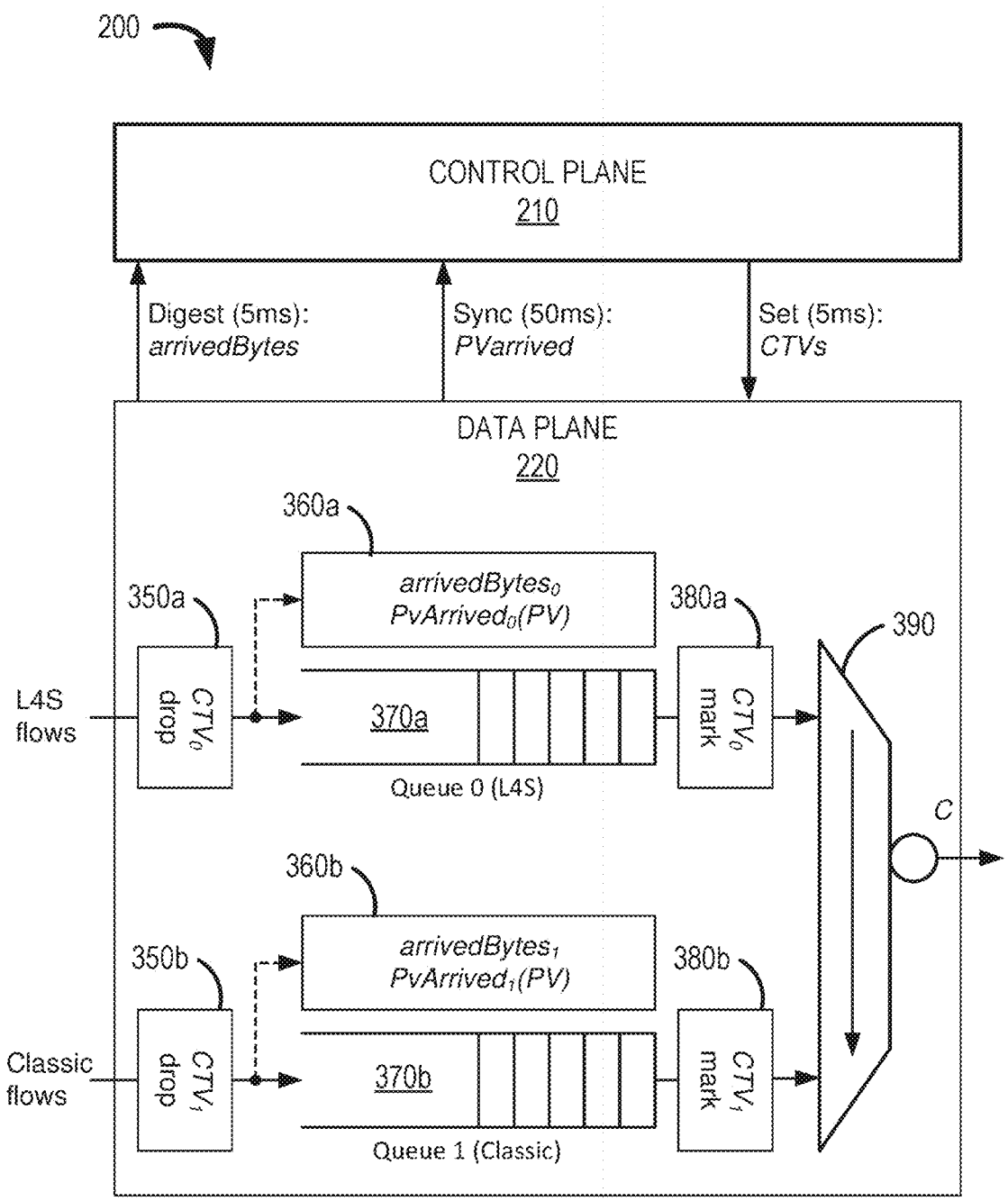
FIG. 3 is a schematic block diagram illustrating an example processing architecture, according to one or more embodiments of the present disclosure.

FIG. 3 is a logical block diagram that schematically illustrates a processing architecture 200 of the intermediate device 110 for processing one or more packets 300. According to the example of FIG. 3, the intermediate device 110 processes received packets 300 using a control plane 210 and a data plane 220 that exchange information with each other. This processing may result in one or more packets 300 being dropped, marked, and/or forwarded, depending on conditions (e.g., one or more values 310, 320, 330 in the packet, received packet sizes, and congestion, among other things). The control plane 210 and data plane 220 may be programmed using the same or different programming languages, depending on the embodiment. For example, the control plane 210 may be programmed using Python, whereas the data plane 220 may be programmed using P4.

The control plane 210 generally establishes the mechanisms by which packets 300 will be handled. Among other things, the control plane may calculate histograms of the received packets 300, maintain virtual queues (VQs) for scheduling packet transmissions, and/or determine congestion threshold values (CTVs) that will be used by the data plane 220 for dropping, marking, and/or forwarding one or more packets 300. Correspondingly, the data plane 220 updates the control plane 210 with information about one or more of the packets 300 received so that the control plane 210 may, for example, make adjustments to address congestion or other network conditions.

The processing architecture 200 is configured to handle packets 300 both L4S flows and classic, non-L4S flows. In some embodiments, the processing architecture 200 may be suitable for integration in AANs, e.g., in order to apply Hierarchical QoS (HQoS) that enforces fairness among subscribers. Such policies may, for example, allows subscribers to utilize their fair share of bandwidth as desired, while also protecting subscribers from each other. In contrast to traditional traffic management engines of available P4-programmable hardware switches, the processing architecture 200 may support more complex HQoS and L4S scheduling. HQoS is solution that is intended to ensure complex resource sharing policies in AANs, where resource sharing is controlled within and among traffic aggregates (TA), e.g., between operators, slices, users, and subflows of users. Traditional HQoS solutions are currently significantly limited, and are typically enforced at the edge in network gateways.

The particular processing architecture 200 shown in FIG. 3 implements Virtual Dual Queue-Core-Stateless Active Queue Management (VDQ-CSAQM). Moreover, the processing architecture 200 can be implemented in P4 and executed in a variety of different types of intermediate devices 110 (e.g., high-speed programmable hardware switches). The processing architecture 200 of the various embodiments may, in particular, provide significant benefits to one or more services that require low latency and/or high bandwidth. Such services may include cloud-rendered gaming, augmented reality, virtual reality, high definition or holographic video conferencing, and/or remote presence services. A particular advantage of specific embodiments may include the ability to introduce new policies simply by reconfiguring how packet marking is performed, and without necessarily changing how scheduling is performed.

As shown in FIG. 3, the data plane 220 isolates and processes L4S flows and classic flows according to respective criteria and using respective physical queues 370a, 370b. Packets 300 comprised in L4S flows are dropped, queued, marked, and/or transmitted based on a first CTV, whereas packets comprised in classic, non-L4S flows are dropped, queued, marked, and/or transmitted based on a second CTV. The CTVs are determined by the control plane 210, and the control plane 210 periodically updates the data plane 220 with these CTVs, e.g., every 5 ms.

Non-ECT packets having a PV 320 less than their corresponding CTV are dropped in the ingress pipeline (350a, 350b) before queueing (370a, 370b), while ECN Congestion Experienced (CE) marking happens at egress (block 380a, 380b). Two groups of counters in which counter overflow is allowed are maintained for each queue (block 360a, 360b). The arrivedBytes counter of each queue counts the amount of bytes arrived at the queue 370a, 370b. The PvArrived counters of each queue 370a, 370b counts the bytes carried in packets 300 having the corresponding PV 320 that arrive at that queue 370a, 370b. The range of PVs may be limited to 1024 different values (encoded into 10 bits), which would correspond to a precision of 3% in the range of 10 kbps to 1 Tbps.

The data plane 220 updates the control plane 210 periodically with the counters. For example, the arrivedBytes counters may be provided to the control plane 210 (e.g., as a digest message) every 5 ms. The PvArrived counters may be synchronized with the control plane 210 every 50 ms. Other embodiments may include other timings as may be appropriate or optimal, e.g., given the line speed into the intermediate device 110.

The control plane 210 maintains virtual queues that correspond to the physical queues 370a, 370b of the data plane 220. The virtual queues are controlled using the aforementioned counters, and in particular, are coupled by considering the counters of the L4S queue 370a with respect to the non-L4S queue 370b. In particular, the PvArrived counters synchronized with the control plane 210 from the data plane 220 are used by the control plane 210 to calculate PV histograms for both queues 370a, 370b. When the digest message with the arrivedbytes counters is received (e.g., every 5 ms), the control plane 210 maintains the virtual queues of the control plane 210 using the arrivedBytes values and their history. Based on the length of the virtual queues, a probability is calculated for marking packets is determined, as will be discussed further below. The CTV, which acts as a PV threshold, is calculated for each queue 370a, 370b as a percentile of the corresponding histogram.

Figure 4A:
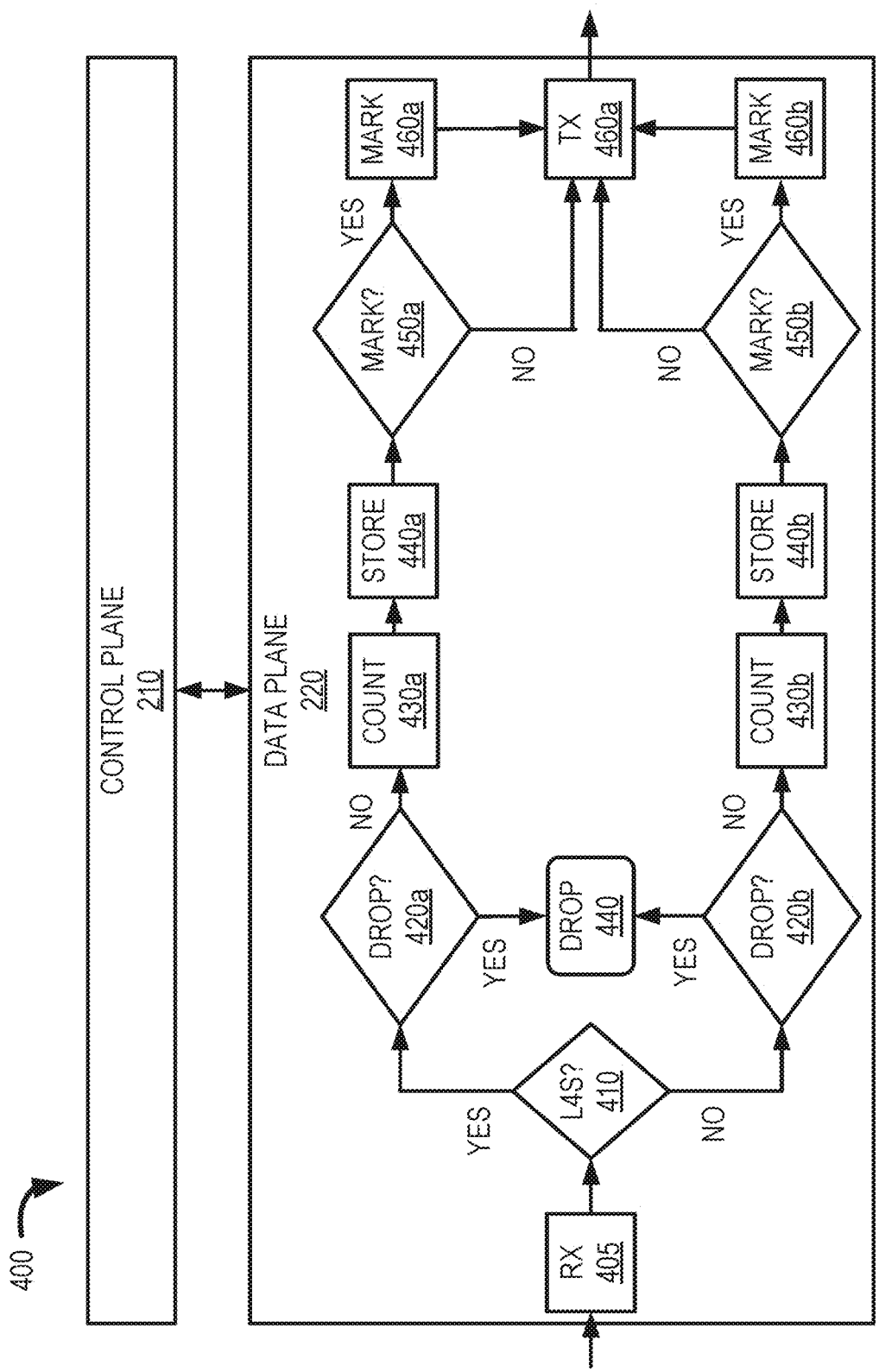
FIGS. 4A and 4B are flow diagrams illustrating an example of packet processing implemented by an intermediate device, according to one or more embodiments of the present disclosure.

FIG. 4A is a block diagram illustrating further details of example processing 400 performed in the data plane 220, according to one or more embodiments of the present disclosure. According to this example, a packet 300 is received by the data plane 220 (block 405). Based on the L4S value 310 of the packet 300, the intermediate device 110 assigns the packet 300 to one of a plurality of packet queues 370a, 370b (block 410). The packet queues 370a, 370b comprise a first queue 370a for packets 300 that support L4S, and a second queue 370b for packets 300 that do not support L4S. The L4S queue 370a (i.e., the first queue) has priority over the non-L4S queue 370b (i.e., the second queue). Therefore, packets 300 comprised in scalable, L4S capable flows are assigned to the first queue (block 410, yes path), whereas packets 300 comprised in classic, non-L4S capable flows are assigned to the second queue (block 410, no path).

If the packet 300 is not ECN capable (e.g., as determined based on the packet's ECN value 330), the intermediate device 110 determines whether or not to drop the packet 300 (block 420a, 420b). In this regard, the intermediate device may determine whether or not to drop the packet based on the CTV of the queue 370a, 370b to which the packet is assigned. As discussed above, the CTVs of the queues 370a, 370b may be periodically updated from the control plane 210. According to embodiments, if the PV 320 of the packet 300 is less than the CTV of the queue 370a, 370b to which that packet 300 is assigned (block 420a-b, yes path), the packet is dropped (step 440).

If the PV 320 of the packet 300 is not less than the CTV of the queue 370a, 370b to which that packet 300 is assigned (block 420a-b, no path), the intermediate device 110 updates one or more packet counters (e.g., arrivedBytes, PvArrived) for the queue 370a, 370b based on one or more features of the packet 300 (block 430a, 430b). For example, the intermediate device 110 may maintain a counter for each queue 370a, 370b that indicates the total amount of data arrived at that queue 370a, 370b (e.g., arrivedBytes). In this regard, the intermediate device 110 may increment the counter of a queue 370 by a size (e.g., in bytes) of the packet 300 arriving at that queue 370.

The intermediate device 110 may additionally or alternatively maintain a count of the total amount of data arrived (e.g., in bytes) per PV 320 for each queue 370a, 370b. According to such embodiments, the intermediate device 110 increments the counter that corresponds to the PV 320 of the packet 300 for the queue 370 to which the packet 300 was assigned. In particular, the counter may be incremented by the size of the packet 300. These per-PV counters may, for example, be maintained by the intermediate device 110 for each queue 370 as an array of integers in which each position of the array corresponds to a unique PV 320 value (e.g., an array of 1024 PvArrived counters, one per unique PV value, for each of the queues 370).

While one or more of the counters may, in some embodiments, accommodate overflow, the counters may nonetheless be sized sufficiently large such that the amount of overflow that occurs is managed and accommodated for by the control plane 210. For example, the intermediate device 110 may allocate memory for storing one or more of the counters described above based on the line rate into the intermediate device 110 weighted by a predefined or configured amount of time. In one particular embodiment, one or more of the counters is large enough to count up to the line rate of the intermediate device 110 times 300 ms worth of bytes. Regardless of whether overflow occurs, a simple subtraction operation of the old value from the new value of a counter can be used to determine how much the counter has changed since previously being updated.

The packet 300 is stored in its assigned queue 370 (block 440a, 440b). As mentioned above, packets 300 stored in the L4S queue 370a (block 440a) are prioritized over packets 300 stored in the non-L4S queue 370b (block 440b). Release from the queues 370a, 370b for subsequent transmission is scheduled by the control plane 210.

Once the packet 300 is released from its assigned queue 370, the intermediate device 110 determines whether or not to mark the packet 300 (block 450a, 450b). In particular, the intermediate device 110 may determine whether or not to mark the packet 300 as having experienced congestion (e.g., by setting the ECN value 330 to a predefined congestion experienced value).

To determine whether or not to mark the packet 300, the intermediate device 110 may determine whether or not the packet 300 supports ECN (e.g., by checking for an appropriate ECN value 330). If so, and if the PV 320 of the packet 300 is less than the CTV of the queue 370 to which the packet 300 is assigned (block 450a-b, yes path), the intermediate device 110 marks the packet as congestion experienced (block 460a, 460b) and sends the packet 300 to the destination interface for transmission (block 470). Otherwise (block 450a-b, no path), the intermediate device 110 refrains from marking the packet and sends the packet 300 to the destination interface for transmission (block 470).

Figure 4B:
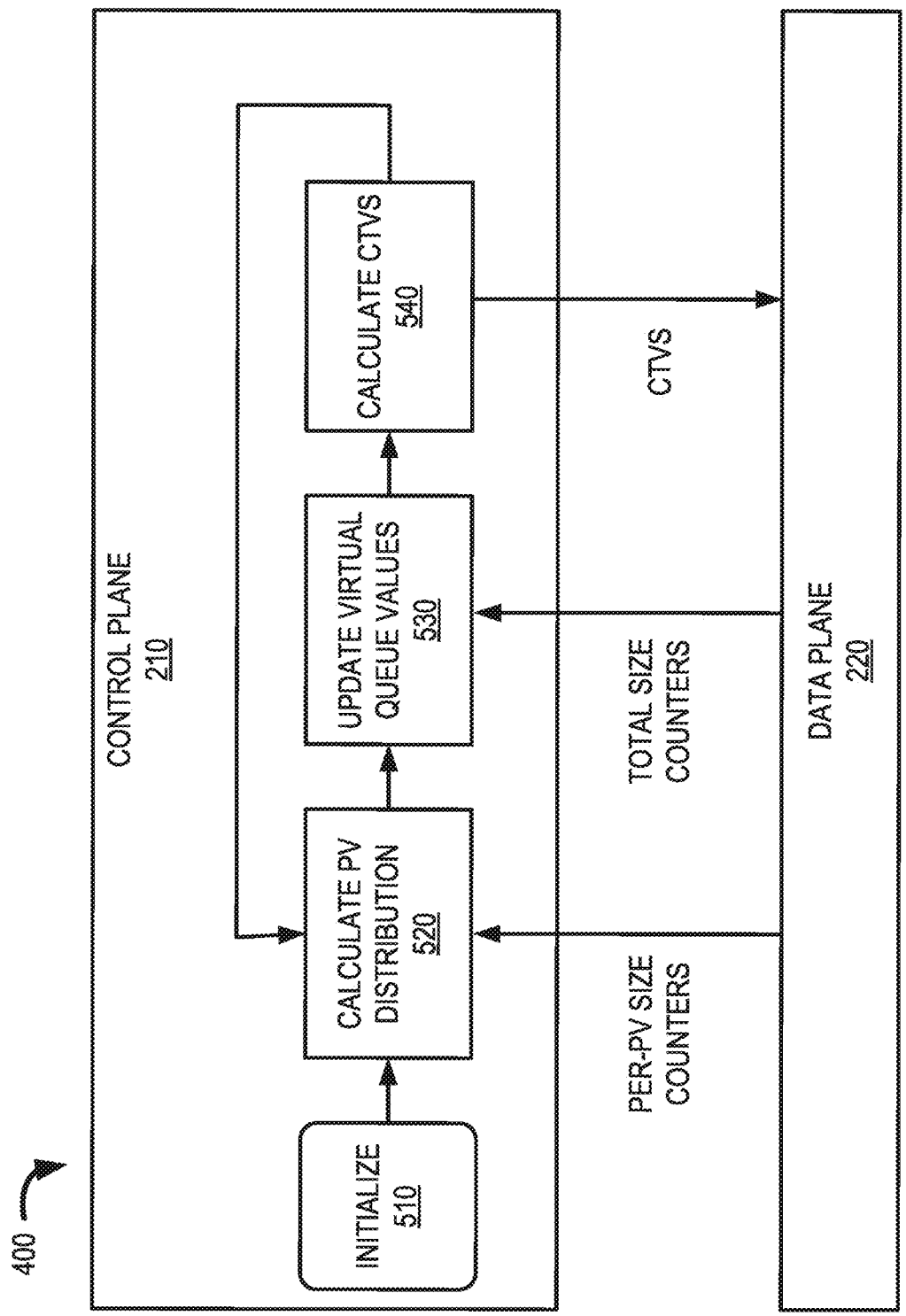

FIG. 4B is a block diagram illustrating further details of example processing 400 performed in the control plane 210, according to one or more embodiments of the present disclosure. According to this example, the processing in the control plane 210 starts with initialization (block 510). During initialization, the CTVs of the queues 370a, 370b are both set to zero, which allows all packets 300 to be transmitted. That is, packets are not be dropped by the data plane 220 when the CTVs are set to zero. One or more other counters and/or values may also default to zero.

In addition, a capacity threshold for each queue 370a, 370b may be set to initial values. For example, the capacity threshold of the L4S queue 370a ($C_0$) may be set to 90% of bottleneck capacity, whereas the capacity threshold of the non-L4S queue 370b ($C_1$) may be set to 98% of bottleneck capacity. Delay targets ($VQTarget_0$, $VQTarget_1$) for the respective virtual queues may also be initialized to appropriate values. For example, a 1 ms delay target may be set for $VQTarget_1$, whereas a 20 ms delay target may be set for $VQTarget_0$, e.g., according to the following formulae:

$$VQTarget_1 = 0.001 * capacity$$

$$VQTarget_0 = 0.02 * capacity$$

As mentioned previously, the data plane 220 may periodically update the control plane 210 with a plurality of PV size counters (e.g., PVArrived) for each of the queues 370a, 370b. Upon receiving the update, the intermediate device 110 determines the distribution of data arriving in packets 300 per PV (block 520). In particular, the intermediate device 110 may calculate a PV histogram for each virtual queue.

The PV histogram for the L4S virtual queue may be calculated based on the difference between the previous PV counter values (e.g., initially zeros) and the updated PV counter values, respectively. Thus, if 64 bytes of data were received in L4S packets 300 having a PV 320 of twelve since the last update, then the value of PVArrived[12] for the L4S virtual queue may be updated with the value 64. As previously mentioned, the subtraction of the previous value from the updated value may allow this difference to be extracted even if an overflow of the counter occurs. The same can be performed for any other counters.

The PV histogram for the non-L4S virtual queue may similarly be calculated based on the difference between the previous PV counter values (e.g., initially zeros) and the updated PV counter values, respectively. However, the PV histogram for the non-L4S virtual queue further considers the amount of data received in L4S packets by adding the PV histogram values for the L4S virtual queue to the PV histogram values of the non-L4S virtual queue, respectively. Thus, if 32 bytes of data were received in non-L4S packets 300 having a PV 320 of twelve since the last update, then the value of PVArrived[12] for the non-L4S virtual queue may be updated with the value of 32+64.

Figure 5:
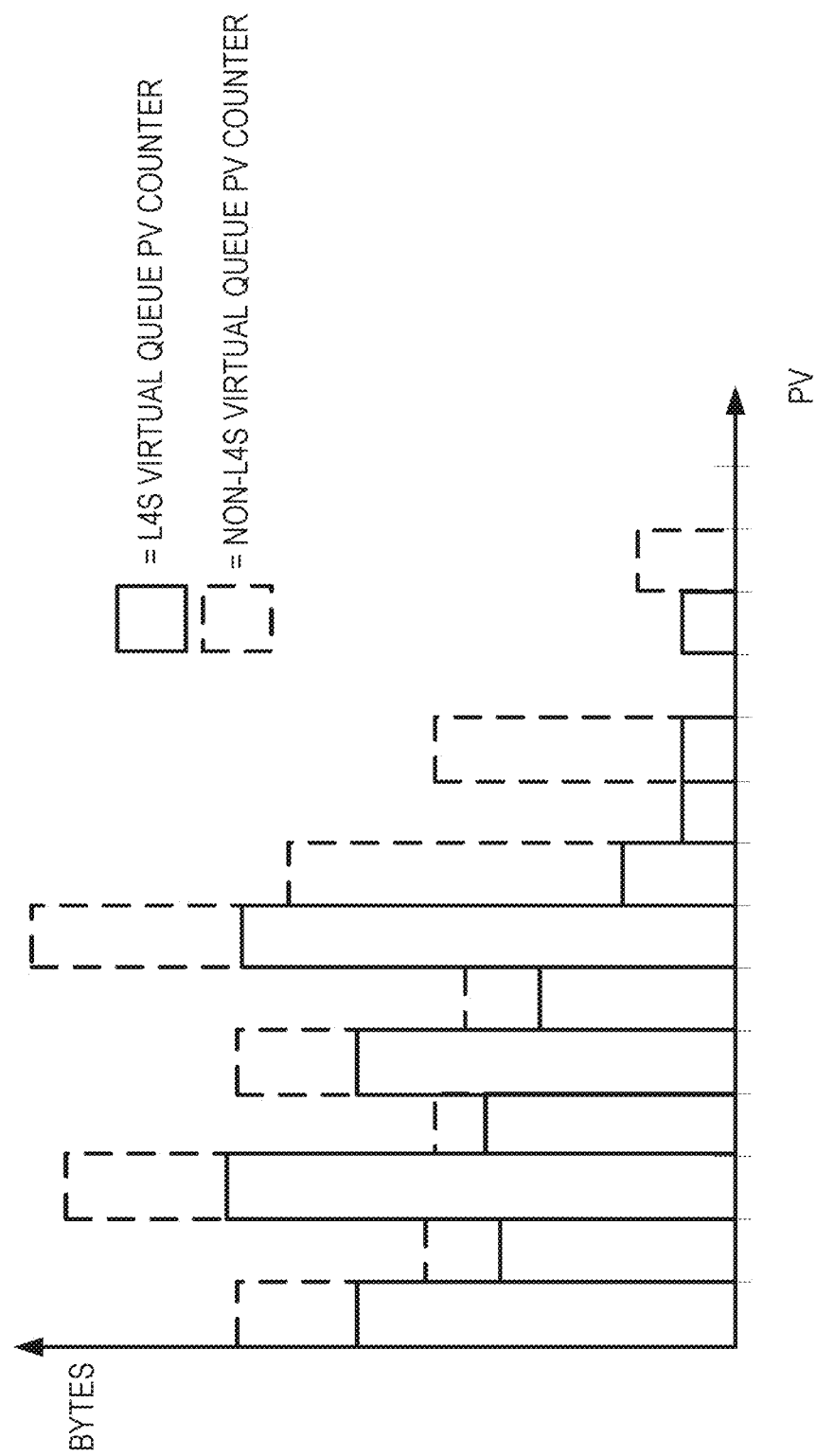
FIG. 5 is a graph illustrating an example histogram of the sizes of packets received having particular packet values in a given interval of time, according to one or more embodiments of the present disclosure.

An example of the histograms of the PV counters is depicted in FIG. 5. As shown in FIG. 5, the histogram for the non-L4S virtual queue includes values that are at least as large as the histogram for the L4S virtual queue. It should be further mentioned that the sum of the histogram values may also be calculated for each of the histograms. For example, given a histogram PVHistogrami of 1024 integers for queue i, a sum SumHistBytesi may be calculated according to the formula $SumHistBytes_i = \Sigma_{n=0}^{1023} PVHistogram_i[n]$.

Returning to FIG. 4B, the data plane 220 may periodically update the control plane 210 with the total size counters (e.g., arrivedBytes) of each of the queues 370a, 370b (e.g., in a packet digest). In some embodiments, the update further includes a corresponding timestamp. Upon receiving the update, the control plane 210 updates certain virtual queue values (block 530).

In particular, for each virtual queue, the difference in time (Δt0, Δt1) and the difference in number of bytes (Δbytes0, Δbytes1) between the new values and the old values is determined (e.g., based on a subtraction operation that compensates for overflow, as previously discussed). Based on these difference values, virtual queue values (VQ0, VQ1) are calculated based on the existing values of (VQ0, VQ1), the capacity thresholds ($C_0$, $C_1$), the time differences ($\Delta t_0$, $\Delta t_1$), and the byte differences ($\Delta bytes_0$, $\Delta bytes_1$) as follows:

$$VQ_0 = VQ_0 - C_0 * \Delta t_0 + \Delta bytes_0$$

$$VQ_1 = VQ_1 - C_1 * \Delta t_1 + \Delta bytes_0 + \Delta bytes_1$$

As can be seen above, the VQ1 value is calculated based on the difference in bytes received for both the L4S queue 370a and the non-L4S queue 370b. In this way, coupled handling of the two queues may be performed. It should be noted that by performing this coupled handling in the control plane 220, data plane 210 resources are preserved.

Figure 6:
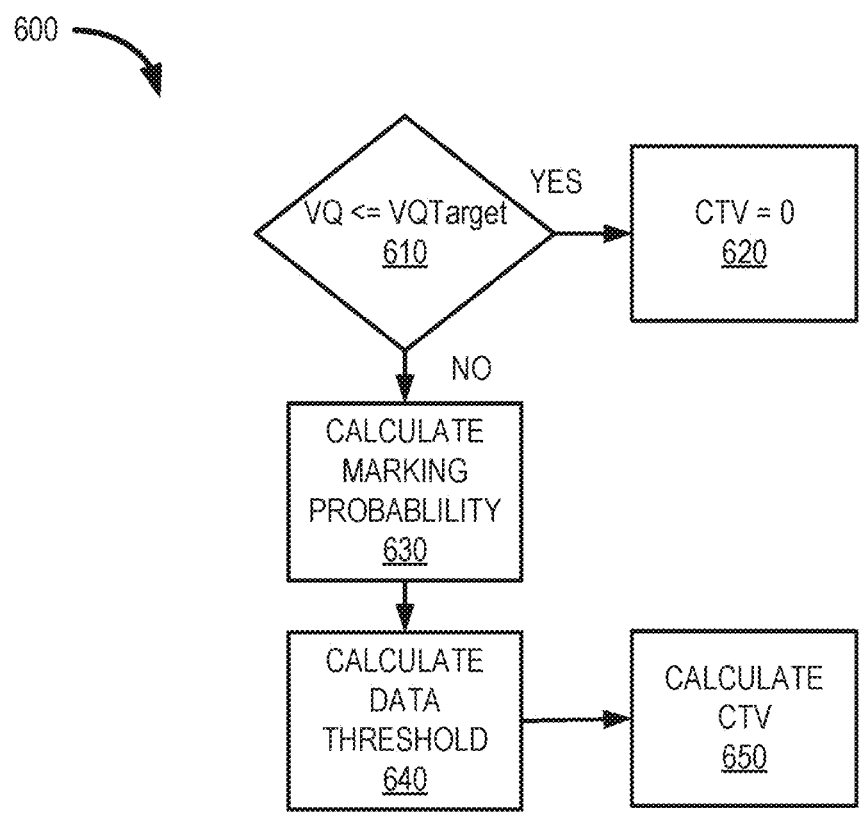
FIG. 6 is a flow diagram illustrating an example process for calculating a congestion threshold value, according to one or more embodiments of the present disclosure.

The new VQ values are used to respectively calculate updated CTVs (block 540) which are then sent to the data plane 220 for use in determining whether or not to subsequently drop or mark packets 300. A process 600 for calculating the CTV of a queue 370 is illustrated in FIG. 6.

The process 600 may be performed for the CTV of each queue 370 based on values corresponding to that queue as described above. First, if the virtual queue value VQ is less than the delay target VQTarget (block 610, yes path), then the CTV is set to zero (block 620) and the process 600 is completed. If not (block 610, no path), then a marking probability (pr_mark) is calculated based on the values of VQTarget and VQ (block 630). In one particular example, the value of pr_mark is calculated according to the formula pr_mark=VQTarget/VQ. In such an example, the probability of marking increases in accordance with the extent to which packets are above the target.

The intermediate device calculates a data threshold (I_mark) based on the marking probability and histogram values of the queue 370 for which the CTV is being calculated (block 640). As will be explained below, the data threshold may, e.g., be a number of bytes to be counted from the histogram in order to determine the CTV. In some particular embodiments, the data threshold may be calculated according to the formula I_mark=pr_mark*SumHistBytes.

The CTV is determined based on the histogram and the data threshold (block 650). In one particular embodiment, a running sum (sumbytes) is initialized to zero, and a counter (j) is initialized to the maximum supported PV value. The value of the histogram at the position indicated by the counter is then added to the running sum and the counter subsequently decremented until the counter reaches zero or the running counter is greater than or equal to the data threshold. That is, the CTV may be calculated according to the following example Python code snippet:

```
for j in range (1023, 0, -1):
    sumbytes += PVHistogram [j]
    if sumbytes >= I_mark:
        CTV = j
        break
```

Calculating the CTV in accordance with the above example code snippet results in the selection of one of the 1024 packet values between zero and 1023 as the CTV. In particular, the selected packet value with be the highest packet value in which a total size of all of packets represented in the histogram having the highest packet value or higher is not less than the data threshold I_mark discussed above. Of course, embodiments of the present disclosure are not limited to the process described by the above example code snippet, as similar results may be programmatically obtained in a variety of ways, depending on the embodiment.

As discussed above, the CTV may be determined for each of the queues 370a, 370b using the process 600. Once calculated for each queue, the CTV values may be forwarded to the data plane 220.

Figure 8:
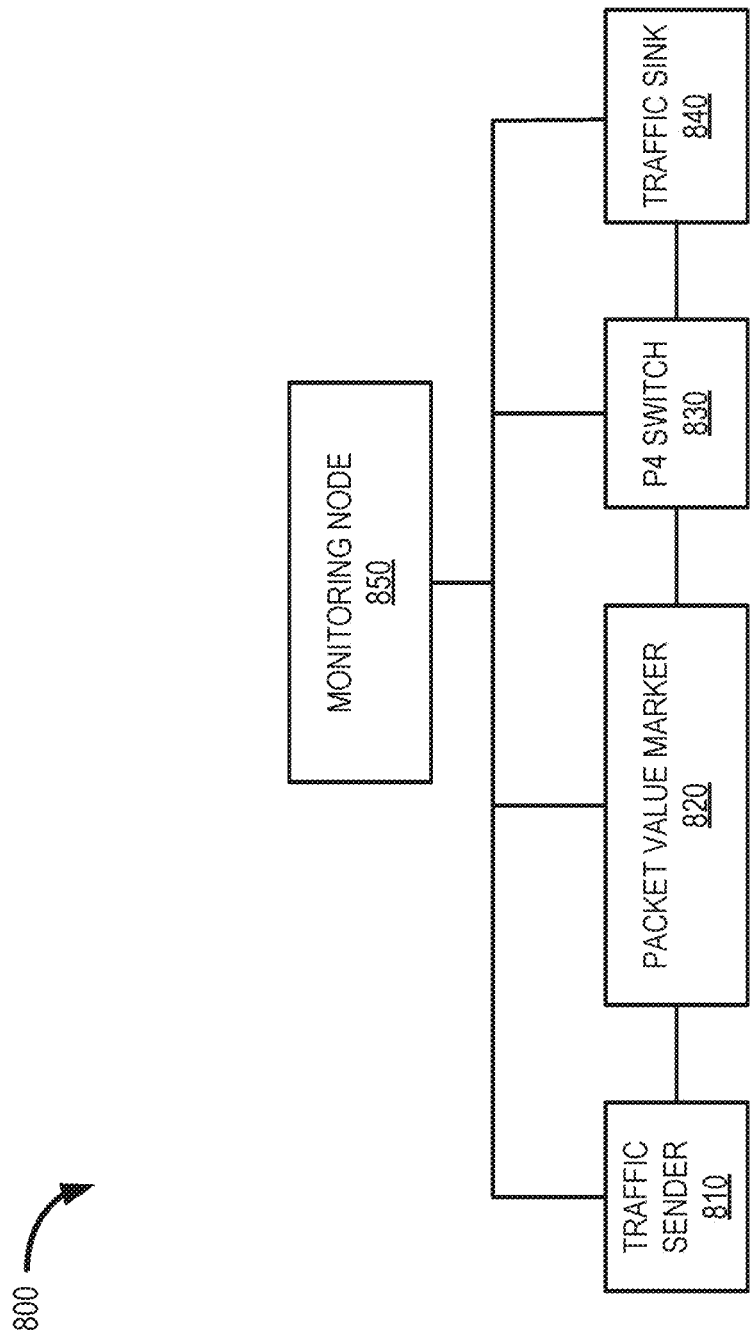
FIG. 8 is a schematic block diagram illustrating an example testbed, according to one or more embodiments of the present disclosure

The embodiments described above were tested using a testbed 800 consisting of five nodes, as shown in FIG. 8. In particular, the testbed 800 comprised a traffic sender 810, a packet value marker 820, a P4 switch 830, a traffic sink 840, and a monitoring node 850.

Each link between the nodes had a 40 Gbps capacity. The traffic sender 810 generated the test traffic. In this regard the traffic sender 810 sent traffic to simulate 15 L4S users and 15 classic background users, as represented by 1 TCP flow per user. An additional designated user sent a classic TCP and/or a Cloud Rendered Gaming flow. The gaming flow was sent using User Data Protocol (UDP) and was not congestion controlled. The gaming flow had a 9 Mbps average rate and had higher speed bursts on shorter timescales, reaching up to 29 Mbps peaks on a 200 ms timescale.

The packet value marker 820 ran a simplified packet marking routine implemented using Data Plane Development Kit (DPDK). By default, the packet value marker assigned the same policy for all users representing equal sharing for all users. The traffic class (L4S or Classic) was encoded into the Differentiated Services Code Point (DSCP) field. The gaming traffic was classified as L4S, and therefore experienced very small delay. The gaming traffic was non-ECN capable, and was therefore subject to being dropped by the Active Queue Management (AQM) features of the implementation. In the HQoS case, the subflows of the designated user were also identified and controlled by the mark.

The P4 Switch was a Stordis BF2556X-1T based on a Tofino Application-Specific Integrated Circuit (ASIC) that implemented the control plane 210 and data plane 220 of the VDQ-CSAQM as described above. The P4 switch comprised an outgoing port towards the traffic sink node 840 and was rate limited at 1 Gbps to emulate an AAN bottleneck.

The traffic sink node 840 terminated the traffic of the users and emulated the propagation Round Trip Time (RTT) of 5 ms by delaying TCP acknowledgements.

The monitoring node 850 collected operational logs from the other nodes, stored them in a time-series database (InfluxDB) and visualized them on a dashboard (Grafana) in real-time.

The example testing covered at least the following three scenarios: 1) Equal sharing for all users and a designated user with gaming traffic only; 2) Equal sharing for all users and a dedicated user with both gaming and classic traffic; and 3) HQoS and a designated user with both gaming and classic traffic.

With respect to scenario 1, the packet value marking ensured that users shared the bottleneck capacity equally, resulting in about 32 Mbps capacity share for each user. As a result, the gaming traffic did not experience loss. This scenario also showed that, using the CSAQM, the unused resources could be occupied by other flows. However, if the rate of the video is increasing, CSAQM saves the stream from packet drops. The experienced queuing delay was almost zero for L4S and small for classic flows.

With respect to scenario 2, the scenario demonstrated that resource sharing among end-users was not enough to provide good quality of experience since other traffic of the same user could also affect the performance of loss-sensitive flows. The presence of a parallel classic flow resulted in an approx. 10-15% loss ratio in the gaming traffic, significantly reducing the quality of experience in case of delay sensitive, real-time applications like cloud rendered gaming. Notwithstanding, the delay of the gaming traffic remained low.

With respect to scenario 3, a different packet value-marking strategy was used to emulate HQoS. In addition to the resource sharing policy among end-users, a second policy-level was introduced, expressing a 4:1 weighting between the video and TCP traffic, respectively. The weighting was solely implemented in the marker node by assigning larger PVs to packets of the video traffic with a higher probability such that the overall PV distribution of the designated user remained unchanged. This meant that the rate of video traffic could be increased up to ⅘th of the user's capacity share without experiencing packet loss. In this scenario, it was enough to avoid the packet loss of the bursty video, resulting in good Quality of Experience (QoE). At the same time the TCP session of the designated user could utilize the rest of the user's fair share despite the burstiness of the video traffic. For less bursty video stream, an even smaller share would be adequate.

Note that resources are not reserved and policies were not communicated to the P4 Switch in any of the scenarios. As long as the HQoS policy and the traffic mix allowed it, lossless and very low delay video streaming remained possible.

In view of the above, embodiments of the present disclosure include a method 700 of processing packets 300. The method 700 is implemented by an intermediate device 110. The method 700 comprises receiving a plurality of packets 300, each packet 300 comprising a packet value 320, the packet value 320 of each packet 300 being one of a plurality of packet values that respectively identify a unique packet classification (block 710). The method 700 further comprises assigning each of the packets 300 to either an L4S queue 370*a* or a non-L4S queue 370*b* (block 720). Each queue 370*a*, 370*b* is associated with one packet value size counter for each of the plurality of packet values. The method 700 further comprises incrementing, for each packet 300 and by a size of the packet, the packet value size counter associated with the queue 370*a*, 370*b* to which the packet is assigned (block 730). The method 700 further comprises calculating, for each queue 370*a*, 370*b*, a congestion threshold value based on the packet value size counters associated with the queue 370*a*, 370*b* (block 740). The method 700 further comprises marking one or more of the packets 300 as having experienced congestion based on the congestion threshold values of the queues 370*a*, 370*b* (block 750).

Other embodiments include an intermediate device 110. The intermediate device 110 may perform one, some, or all of the functions described above, depending on the embodiment. In one example, the intermediate device 110 is implemented according to the hardware illustrated in FIG. 9. The example hardware of FIG. 9 comprises processing circuitry 910, memory circuitry 920, and interface circuitry 930. The processing circuitry 910 is communicatively coupled to the memory circuitry 920 and the interface circuitry 930, e.g., via one or more buses. The processing circuitry 910 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 910 may be programmable hardware capable of executing software instructions stored, e.g., as a machine-readable computer program 960 in the memory circuitry 920. The computer program 960 may comprise a control plane 210 and/or a data plane 220 as discussed above, for example. The memory circuitry 920 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 930 may be a controller hub configured to control the input and output (I/O) data paths of the intermediate device 110. Such I/O data paths may include data paths for exchanging signals over a communications network 100. For example, the interface circuitry 930 may comprise one or more transceivers configured to send and receive communication signals over one or more packet-switched networks, cellular networks, and/or optical networks.

The interface circuitry 930 may be implemented as a unitary physical component, or as a plurality of physical components that are contiguously or separately arranged, any of which may be communicatively coupled to any other, or may communicate with any other via the processing circuitry 910. For example, the interface circuitry 930 may comprise output circuitry (e.g., transmitter circuitry configured to send communication signals over the communications network 100) and input circuitry (e.g., receiver circuitry configured to receive communication signals over the communications network 100). Other examples, permutations, and arrangements of the above and their equivalents will be readily apparent to those of ordinary skill.

Figure 7:
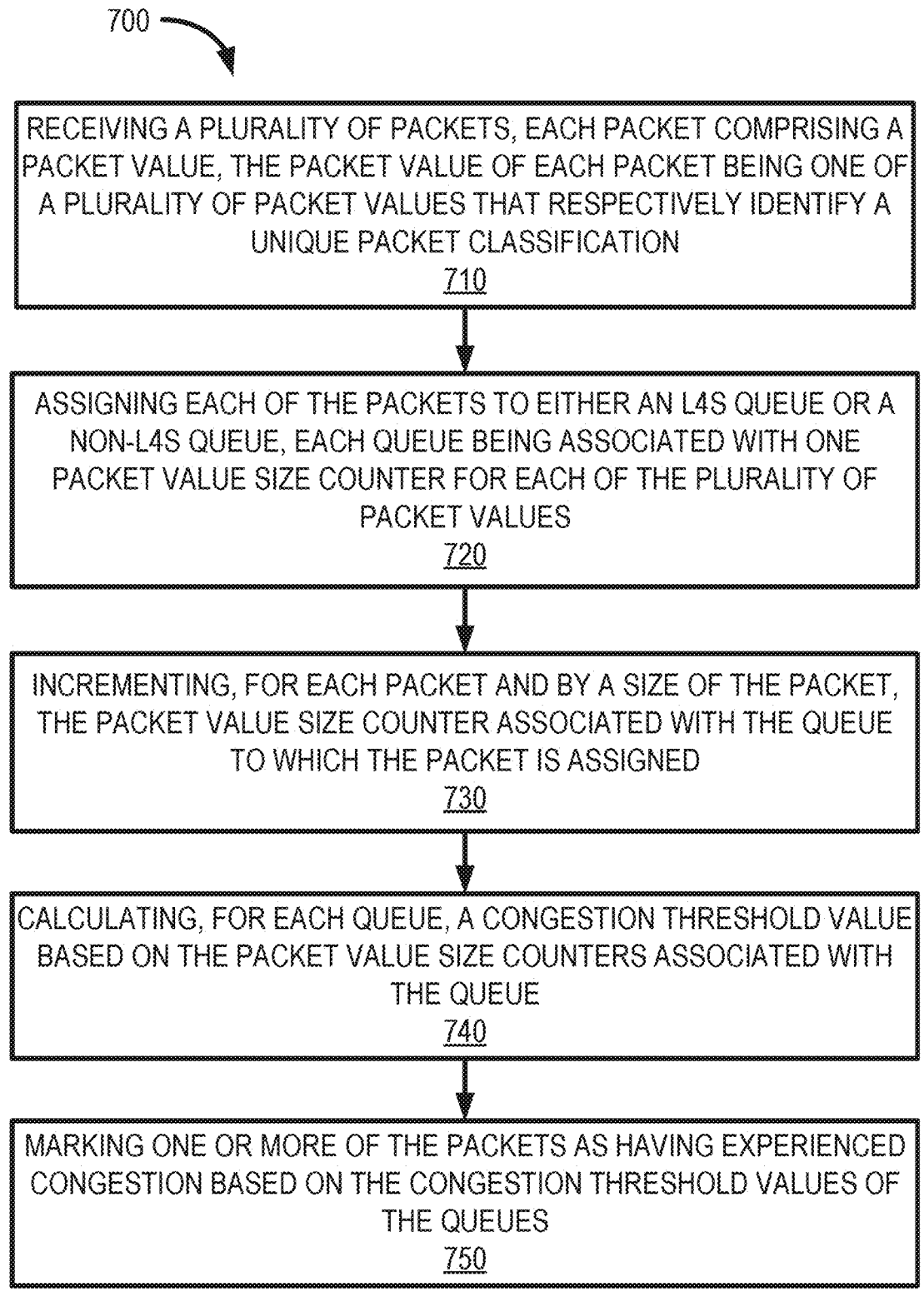
FIG. 7 is a flow diagram illustrating an example method according to one or more embodiments of the present disclosure.
Figure 9:
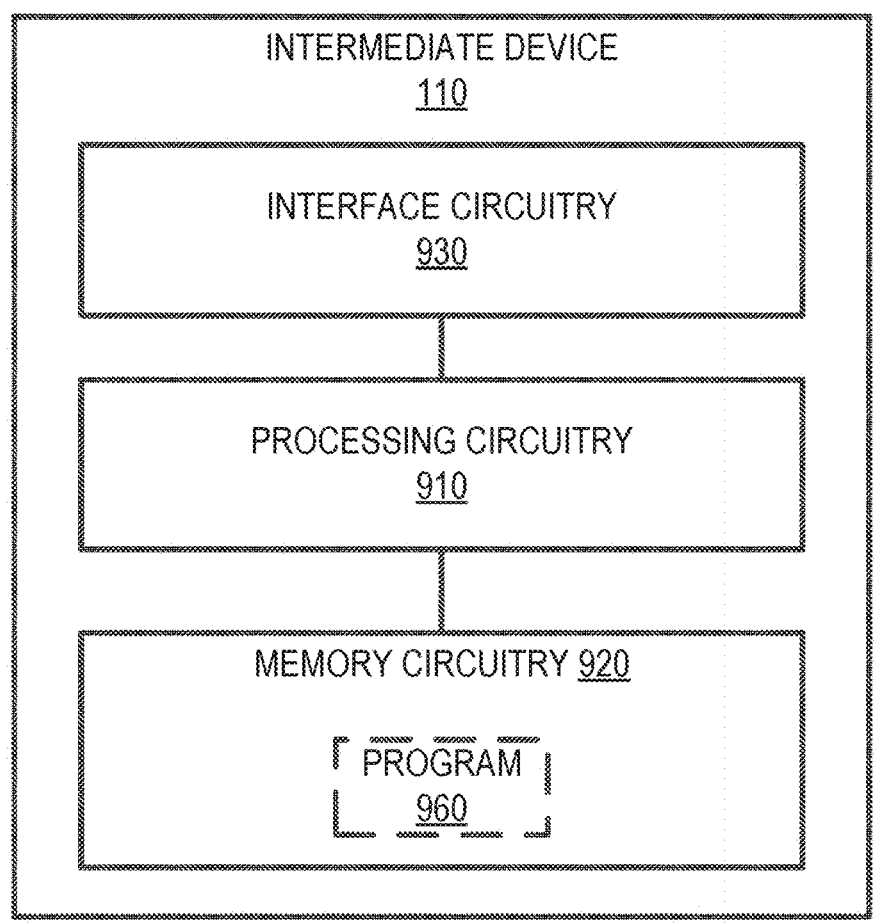
FIG. 9 is a schematic block diagram illustrating an example intermediate device, according to one or more embodiments of the present disclosure.

According to embodiments of the hardware illustrated in FIG. 9, the interface circuitry 930 is configured to perform the method 700 illustrated in FIG. 7. In some embodiments, the intermediate device 110 is configured to receive a plurality of packets 300, each packet 300 comprising a packet value 320, the packet value 320 of each packet 300 being one of a plurality of packet values that respectively identify a unique packet classification. The intermediate device 110 is further configured to assign each of the packets 300 to either an L4S queue 370a or a non-L4S queue 370b. Each queue 370a, 370b is associated with one packet value size counter for each of the plurality of packet values. The intermediate device 110 is further configured to increment, for each packet 300 and by a size of the packet, the packet value size counter associated with the queue 370a, 370b to which the packet is assigned. The intermediate device 110 is further configured to calculate, for each queue 370a, 370b, a congestion threshold value based on the packet value size counters associated with the queue 370a, 370b. The intermediate device 110 is further configured to mark one or more of the packets 300 as having experienced congestion based on the congestion threshold values of the queues 370a, 370b. In some embodiments, the intermediate device 110 is configured by the execution of a computer program 960 by the processing circuitry 910.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the embodiments enumerated below are intended to be embraced therein.

The invention claimed is:

1. A method, implemented by an intermediate device of a communication network, the method comprising:
    receiving a plurality of packets, each packet comprising a packet value, the packet value of each packet being one of a plurality of packet values that respectively identify a unique packet classification;
    assigning each of the packets to either a Low Latency, Low Loss, Scalable throughput (L4S) queue or a non-L4S queue, each queue being associated with one packet value size counter for each of the plurality of packet values;
    incrementing, for each packet and by a size of the packet, the packet value size counter associated with the queue to which the packet is assigned;
    generating, for each of the queues, a histogram representing a distribution of the packet values comprised in the plurality of packets;
    calculating, for each queue, a congestion threshold value based on the packet value size counters associated with the queue, wherein calculating the congestion threshold value for each queue comprises selecting the congestion threshold value of each queue based on the histogram of the queue; and
    marking one or more of the packets as having experienced congestion based on the congestion threshold values of the queues.

2. The method of claim 1, further comprising incrementing, for each packet and by the size of the packet, a total size counter associated with the queue to which the packet is assigned, wherein calculating the congestion threshold value for each queue is further based on the total size counter associated with the queue.

3. The method of claim 2, further comprising periodically updating a control plane of the intermediate device with the total size counters of the queues.

4. The method of claim 3, further comprising periodically updating the control plane of the intermediate device with the packet value size counters associated with each of the queues.

5. The method of claim 4, wherein the periodic updating of the control plane with the total size counters is more frequent than the periodic updating of the control plane with the packet value size counters.

6. The method of claim 1, wherein selecting the congestion threshold value of each queue based on the histogram of the queue comprises selecting, as the congestion threshold value of the queue, the highest packet value in which a total size of all of packets represented in the histogram having the highest packet value or higher is not less than a threshold.

7. The method of claim 6, further comprising calculating the threshold based on a total size of the packets represented in the histogram and a marking probability.

8. The method of claim 4, further comprising periodically performing the calculating of the congestion threshold values for each queue, by the control plane, responsive to the periodic updating of the control plane with the total size counters associated with the queues.

9. The method of claim 1, further comprising:
    receiving a plurality of additional packets respectively comprising packet values;
    assigning each of the additional packets to one of the queues; and
    determining, for each of the additional packets, whether to drop the additional packet based on the congestion threshold value of the queue and the packet value of the additional packet.

10. An intermediate device comprising:
    processing circuitry and a memory, the memory containing instructions executable by the processing circuitry whereby the intermediate device is configured to:
        receive a plurality of packets, each packet comprising a packet value, the packet value of each packet being one of a plurality of packet values that respectively identify a unique packet classification;
        assign each of the packets to either a Low Latency, Low Loss, Scalable throughput (L4S) queue or a non-L4S queue, each queue being associated with one packet value size counter for each of the plurality of packet values;
        increment, for each packet and by a size of the packet, the packet value size counter associated with the queue to which the packet is assigned;
        generate, for each of the queues, a histogram representing a distribution of the packet values comprised in the plurality of packets;
        calculate, for each queue, a congestion threshold value based on the packet value size counters associated with the queue, wherein to calculate the congestion threshold value for each queue the intermediate device is configured to select the congestion threshold value of each queue based on the histogram of the queue; and
        mark one or more of the packets as having experienced congestion based on the congestion threshold values of the queues.

11. The intermediate device of claim 10, further configured to increment, for each packet and by the size of the packet, a total size counter associated with the queue to which the packet is assigned, wherein calculating the congestion threshold value for each queue is further based on the total size counter associated with the queue.

12. The intermediate device of claim 11, further configured to periodically update a control plane of the intermediate device with the total size counters of the queues.

13. The intermediate device of claim 12, further configured to periodically update the control plane of the intermediate device with the packet value size counters associated with each of the queues.

14. The intermediate device of claim 13, wherein the periodic updating of the control plane with the total size counters is more frequent than the periodic updating of the control plane with the packet value size counters.

15. The intermediate device of claim 10, wherein to select the congestion threshold value of each queue based on the histogram of the queue the intermediate device is configured to select, as the congestion threshold value of the queue, the highest packet value in which a total size of all of packets represented in the histogram having the highest packet value or higher is not less than a threshold.

16. The intermediate device of claim 15, further configured to calculate the threshold based on a total size of the packets represented in the histogram and a marking probability.

17. The intermediate device of claim 13, further configured to periodically perform the calculating of the congestion threshold values for each queue, by the control plane, responsive to the periodic updating of the control plane with the total size counters associated with the queues.

18. The intermediate device of claim 10, further configured to:
receive a plurality of additional packets respectively comprising packet values;
assign each of the additional packets to one of the queues; and
determine, for each of the additional packets, whether to drop the additional packet based on the congestion threshold value of the queue and the packet value of the additional packet.

19. A non-transitory computer readable medium storing a computer program product for controlling an intermediate device in a wireless communication network, the computer program product comprising software instructions that, when run on the intermediate device, cause the intermediate device to:
receive a plurality of packets, each packet comprising a packet value, the packet value of each packet being one of a plurality of packet values that respectively identify a unique packet classification;
assign each of the packets to either a Low Latency, Low Loss, Scalable throughput (L4S) queue or a non-L4S queue, each queue being associated with one packet value size counter for each of the plurality of packet values;
increment, for each packet and by a size of the packet, the packet value size counter associated with the queue to which the packet is assigned;
generate, for each of the queues, a histogram representing a distribution of the packet values comprised in the plurality of packets;
calculate, for each queue, a congestion threshold value based on the packet value size counters associated with the queue, wherein calculating the congestion threshold value for each queue comprises selecting the congestion threshold value of each queue based on the histogram of the queue; and
mark one or more of the packets as having experienced congestion based on the congestion threshold values of the queues.

* * * * *